US009671117B2

(12) United States Patent
Dinnage

(10) Patent No.: US 9,671,117 B2
(45) Date of Patent: Jun. 6, 2017

(54) DESICCANT DEHUMIDIFICATION SYSTEM WITH CHILLER BOOST

(75) Inventor: Paul Dinnage, New Braunfels, TX (US)

(73) Assignee: Munters Corporation, Selma, TX (US)

( * ) Notice: Subject to any disclaimer, the term of this patent is extended or adjusted under 35 U.S.C. 154(b) by 325 days.

(21) Appl. No.: 13/988,692

(22) PCT Filed: Nov. 18, 2011

(86) PCT No.: PCT/US2011/061404
§ 371 (c)(1),
(2), (4) Date: Jul. 17, 2013

(87) PCT Pub. No.: WO2012/071270
PCT Pub. Date: May 31, 2012

(65) Prior Publication Data
US 2013/0298580 A1    Nov. 14, 2013

Related U.S. Application Data

(60) Provisional application No. 61/416,053, filed on Nov. 22, 2010.

(51) Int. Cl.
*F25D 17/06*    (2006.01)
*F24F 3/14*    (2006.01)
*B01D 53/06*    (2006.01)
*B01D 53/26*    (2006.01)

(52) U.S. Cl.
CPC ............... *F24F 3/14* (2013.01); *B01D 53/06* (2013.01); *B01D 53/261* (2013.01); *F24F 3/1423* (2013.01); *B01D 2257/80* (2013.01); *B01D 2258/06* (2013.01); *B01D 2259/4009* (2013.01); *F24F 2203/026* (2013.01); *F24F 2203/1032* (2013.01)

(58) Field of Classification Search
CPC .... F24F 3/14; F24F 3/1423; F24F 2203/1032; F24F 2203/1016; B01D 53/261
See application file for complete search history.

(56) References Cited

U.S. PATENT DOCUMENTS

| | | | |
|---|---|---|---|
| 5,564,281 A | 10/1996 | Calton et al. | |
| 5,718,122 A | 2/1998 | Maeda | |
| 5,791,153 A * | 8/1998 | Belding et al. | 62/93 |
| 5,931,016 A | 8/1999 | Yoho, Sr. | |
| 6,324,860 B1 * | 12/2001 | Maeda | F24F 3/1423 62/271 |

(Continued)

FOREIGN PATENT DOCUMENTS

JP    2009-208001    9/2009

*Primary Examiner* — Elizabeth Martin
(74) *Attorney, Agent, or Firm* — Fitzpatrick, Cella, Harper & Scinto

(57) ABSTRACT

A hybrid dehumidification system for controlling the humidity and/or both humidity and temperature in a space includes a cooling coil for first cooling, or cooling and reducing the humidity of, an airstream to be supplied to the space with an aqueous cooling medium, passing the thus cooled airstream through a desiccant adsorption means to further reduce the humidity of the airstream before supplying the airstream to the space, and regenerating the desiccant adsorption means by heating the desiccant with waste heat from a heat pump used to further cool the first aqueous cooling medium.

22 Claims, 5 Drawing Sheets

(56) References Cited

U.S. PATENT DOCUMENTS

| | | | |
|---|---|---|---|
| 6,331,557 B1 | 12/2001 | Brugnara et al. | |
| 6,557,365 B2 | 5/2003 | Dinnage et al. | |
| 6,711,907 B2 | 3/2004 | Dinnage et al. | |
| 7,047,751 B2 | 5/2006 | Dinnage et al. | |
| 7,306,650 B2 * | 12/2007 | Slayzak | B01D 47/14 95/231 |
| 8,631,661 B2 * | 1/2014 | Teige et al. | 62/94 |
| 2003/0121271 A1 * | 7/2003 | Dinnage | F24F 3/1405 62/94 |
| 2005/0050906 A1 | 3/2005 | Dinnage et al. | |
| 2006/0042295 A1 * | 3/2006 | Assaf | F24F 3/1417 62/314 |
| 2010/0242507 A1 * | 9/2010 | Meckler | F24F 3/1423 62/94 |
| 2012/0031133 A1 * | 2/2012 | Kuwabara | F24F 3/1423 62/271 |

* cited by examiner

US 9,671,117 B2

DESICCANT DEHUMIDIFICATION SYSTEM WITH CHILLER BOOST

This application claims the benefit of the priority date of a prior filed U.S. provisional application Ser. No. 61/416,053 filed Nov. 22, 2010.

BACKGROUND OF THE INVENTION

Field of the Invention

Dehumidification systems have long used aqueous based cooling systems to cool air down to a desired absolute humidity range, prior to introduction into a space, as a means for humidity control. Such systems are very energy intensive since a heat source is needed to raise the supply air temperature so that the space does not become too cold. Many enhancements have been made to this basic cycle including the use of heat transfer means for capturing some of the heat of the air before it is cooled, e.g. in a cooling coil. Such systems then use that heat to partially or completely reheat the supply/process air after it leaves the cooling coil. These devices have the additional benefit that reducing the temperature of the air before the cooling coil in this way not only reduces the reheating needs, but also slightly reduces the cooling needs. The heat transfer is customarily accomplished in these prior art systems through plate heat exchangers, heat pipes or closed loop coil to coil water based systems.

Hybrid dehumidification systems including both a cooling means and a desiccant means have also been utilized to achieve these functions. Such systems utilize the cooling means to cool, or reduce the enthalpy of, the air stream to the desired range, and the desiccant means to reduce the moisture content. These systems come in many varieties and include all forms of cooling means. The heating means historically utilized high grade heat to regenerate the desiccant, but increasingly with the advancement of desiccant knowledge, they have also utilized low grade waste heat from a refrigerant direct expansion condensing system or even low ambient relative humidity air as a means of desiccant regeneration.

In the most advanced hybrid dehumidification systems a direct expansion refrigeration system is used to cool the air to be supplied to the space and to reject heat to the air stream which regenerates the desiccant. Examples of such systems are disclosed in the Dinnage et al. U.S. Pat. Nos. 6,557,365; 6,711,907 and 7,047,751. Those systems take advantage of the efficiency of the desiccant wheel to adsorb moisture more effectively at saturation by transferring the heat from the supply air being treated before the desiccant means to the regeneration stream. U.S. Pat. No. 5,564,281 to Calton et al. discloses the transfer of heat from the desiccant process/supply leaving stream, which is at a higher temperature, to the reactivation stream, thus improving the vapor compressor cycle efficiency, albeit with reduced desiccant efficiency.

The Backman system disclosed in U.S. Pat. No. 6,331,557 goes so far as to integrate the desiccant system into the main cooling system, utilizing the primary central aqueous cooling medium as the only source of cooling in the hybrid system, and rejecting heat from that central system as the only means of regeneration heat for the desiccant wheel.

One of the main drawbacks of the above described types of hybrid dehumidification systems is that the efficiency of the cycle is limited by the large difference in temperatures between the heat source (supply/process air) and the heat sink (regeneration air). That large temperature difference works against vapor compression cycle efficiency. In the Backman system, the limited temperature differential between the hot and cold side of the chiller system limits the desiccant capability. The Koho Patent, U.S. Pat. No. 5,931,016, and others, have tried to limit this temperature difference by applying the evaporator to the hotter air leaving the desiccant wheel. However, the desiccant cycle works best with saturated air entering the desiccant, so efficiency is lost on the desiccant side with this approach.

Chilled water systems are known to have great energy efficiency as they are able to reject their heat to a cooling tower which is at a temperature close to the ambient wet bulb. Therefore, while the engineered energy load for a chilled water system (tons of cooling) may indicate that it uses more energy than a hybrid system, the actual energy difference between those alternative systems, in terms of utility use (electricity measured in KWH), can be less than might be expected due to the increased efficiency of the chiller systems over the hybrid systems. However, the hybrid systems still remain generally more efficient.

SUMMARY OF THE INVENTION

The present invention discloses a means by which the efficiency of a chiller system may be combined with a hybrid desiccant dehumidification system in a way which enhances the energy efficiency performance of the chiller and reduces the energy needs of the hybrid desiccant system while improving its operational stability at low loads.

A better understanding of these and other aspects of the present invention may be had by reference to the drawings and to the accompanying description, in which preferred embodiments of the invention are illustrated and described.

DETAILED DESCRIPTION

Figure 1:
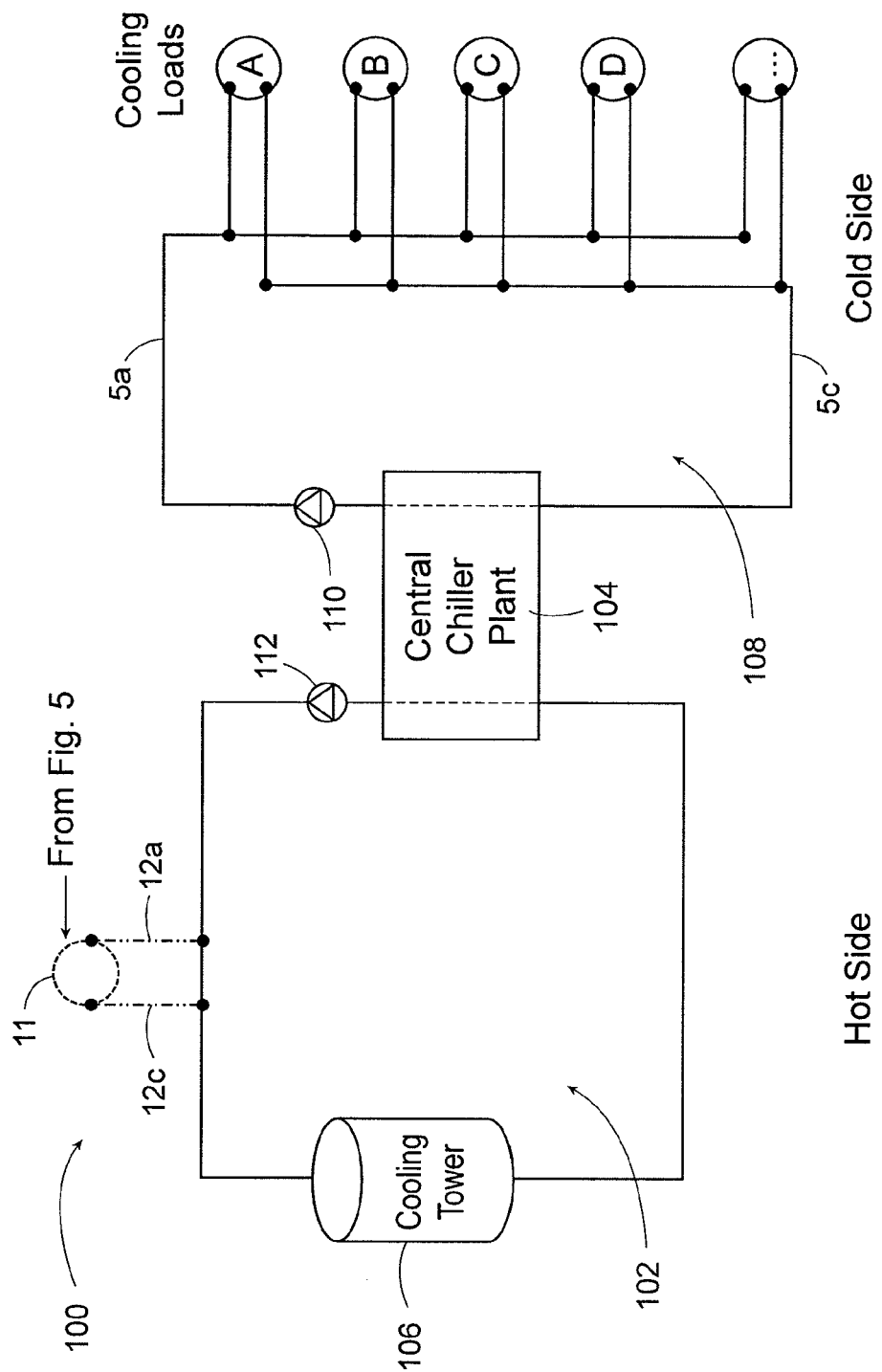
FIG. 1 is a schematic view of a conventional chilled water/liquid cooling system which can be used in systems according to the present invention.

Referring now to the drawing in detail and initially to FIG. 1 a conventional Central Chiller Plant system 100 is disclosed which includes an aqueous/liquid coolant side 102, a central chiller plant 104, and a cooling tower 106 in what is referred to as the "hot side" of the plant. On the cold side 108 of the plant a pump 110 circulates cold aqueous liquid such as water or glycol refrigerant to one or more heat exchangers or cooling loads and returns the coolant to the central plant where the chiller plant transfers the heat to ambient air either directly or through a second warm or hot aqueous loop which is cooled by a cooling tower 106, for instance. The cooling loads on the cold side of the plant are identified by the letters A, B, C, D and . . . in the drawings.

In the embodiment illustrated in FIG. 1 the coolant on the hot side 102 removes heat from the coolant on the cold side in the chiller 104, and a pump 112 pumps the hot side coolant from the chiller to the cooling tower 106 where it is cooled and returned to the chiller in the conventional manner. Alternatively coolant from the chiller 104 can be air cooled rather than cooled via a tower, as would be understood by those skilled in the art.

Figure 2:
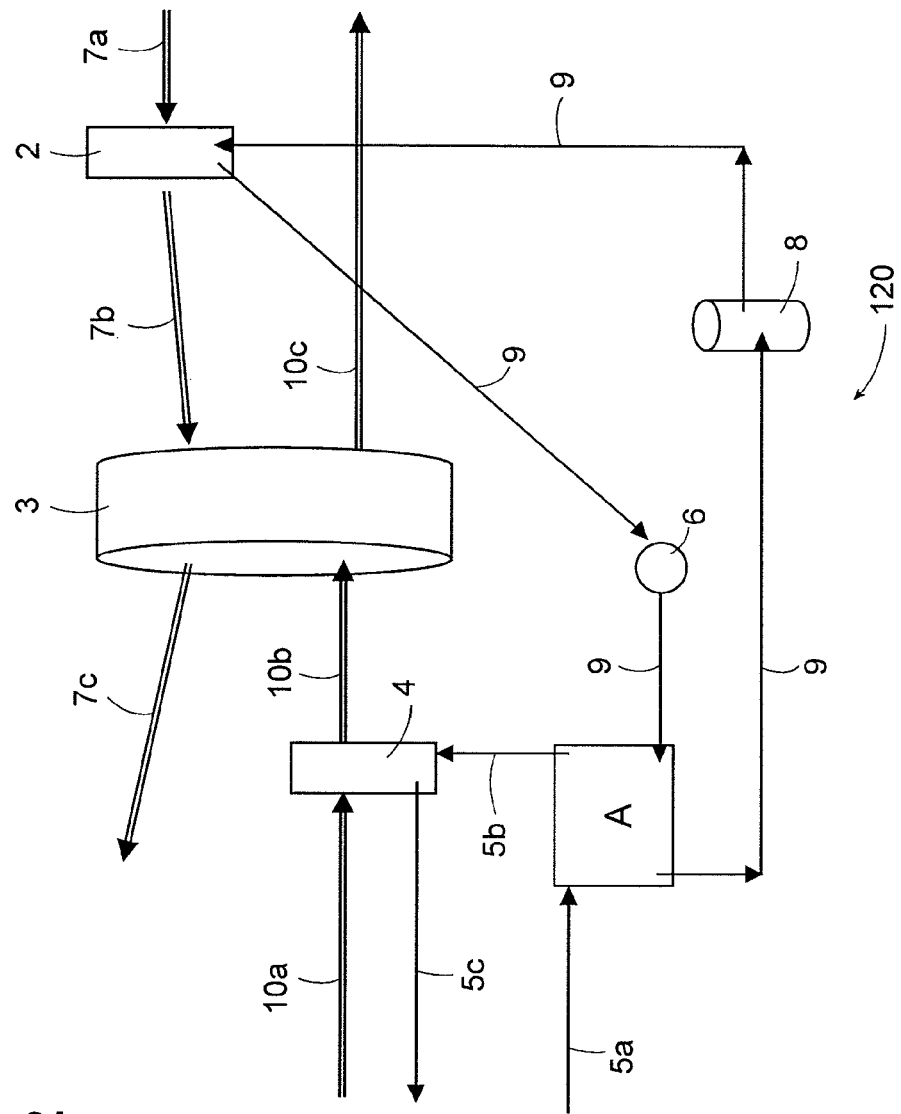
FIG. 2 is a schematic illustration of one embodiment of this invention using the central aqueous/liquid cooling medium of the system of FIG. 1 with a direct expansion refrigeration system to treat the process air and regeneration air streams in a desiccant dehumidification system.

FIG. 2 illustrates the use of a direct expansion refrigeration system and desiccant wheel device associated with the chiller plant of FIG. 1. As seen in FIG. 1, the coolant supply line 5a on the cold side of the plant supplies chilled coolant to various equipment including heat exchangers or heating loads A-D, etc. One of these elements may be a heat exchanger A which is part of a direct expansion refrigeration system 120 consisting of a compressor 8, refrigerant lines 9, a heat exchanger 2, and expansion valve 6.

Compressor 8 compresses the refrigerant in line 9 which flows in the direction of the arrowheads on the lines in the drawings. The compressed and heated refrigerant then passes through the heat exchanger 2 and gives up heat to a regeneration air supply stream 7a to heat the air stream before it enters the regeneration section of a rotating desiccant wheel 3. The heated regeneration air stream 7b will reduce the moisture content of the desiccant and is then discharged as an exhaust stream 7c. The refrigerant flows from heat exchanger 2 through expansion valve 6 where its pressure and temperature is reduced. The expanded refrigerant is then evaporated in the heat exchanger A (typically a plate or tube in tube type heat exchanger) and absorbs heat from the chilled liquid loop. The now further chilled liquid coolant from chiller line 5a is then passed through another heat exchanger 4 to cool a process/supply airstream 10a to be dehumidified and then is supplied to the coolant return line 5c. The heat exchanger or chilled water coil 4 is illustrated as being located upstream of desiccant wheel 3 in FIG. 1 but it may be located downstream of the wheel to cool the process/supply air after it passes through the regenerated desiccant.

Accordingly it will be appreciated that rather than try to minimize the temperature difference between the evaporator and condenser of the direct (DX) refrigerant system to improve the DX efficiency, the DX system size used in accordance with this invention can be minimized since much of the work to chill the process air is done by the high efficiency chiller. Thus the lower efficiency DX system has less of a role in the overall system efficiency.

Under typical circumstances where dehumidification performance needs to be maximized, the evaporator heat exchanger A would be located in the chilled water loop prior to the cooling coil 4, as seen in FIG. 2 so that the aqueous coolant is cooled to a lower temperature before being applied to the process air 10. This will maximize dehumidification using the higher COP process of removal of moisture via cooling, and achieve a lower dew point than the chilled water means can by itself.

Figure 3:
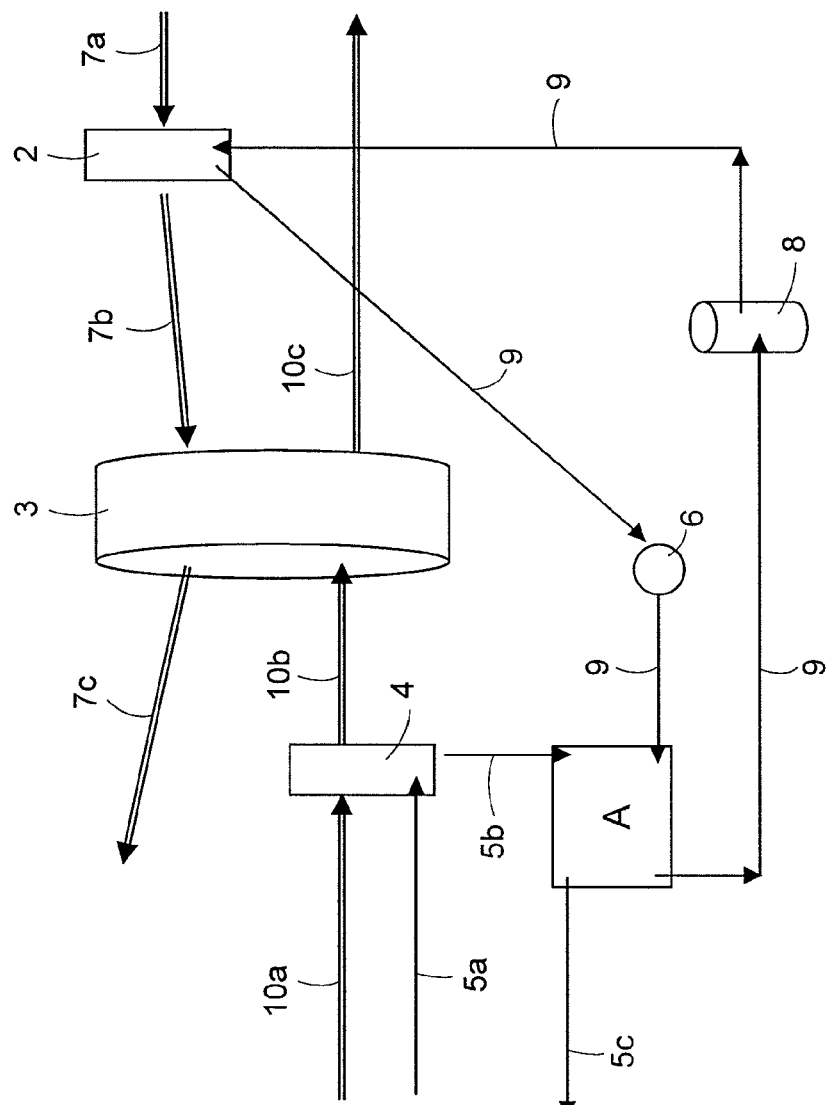
FIG. 3 is a schematic illustration of another embodiment of the present invention.

However, because desiccant cycles have many purposes and dependent variables, one could, instead, choose to use a higher temperature to regenerate the desiccant wheel rotor. With this approach low dewpoints are still achievable, but the temperature of the air leaving the desiccant will be warmer as more latent to sensible heat conversion has been done by the desiccant means. This would be the case where, for example, the dry air from the wheel is not being used for air conditioning, but for a drying process. This embodiment of the invention is shown in FIG. 3 wherein the evaporator A is located to receive coolant from line 5a after it passes through the chilled water coil 4 and before it is then supplied to the coolant to return line 5c. This arrangement will reduce the temperature difference between evaporator A and condenser 4, as compared to the embodiment of FIG. 1, thus improving the COP of the DX system and increasing its ability to generate the higher regeneration temperatures needed to achieve lower dewpoints. All other components in this embodiment bear the same reference numerals as the corresponding components of the embodiment of FIG. 2.

Figure 4:
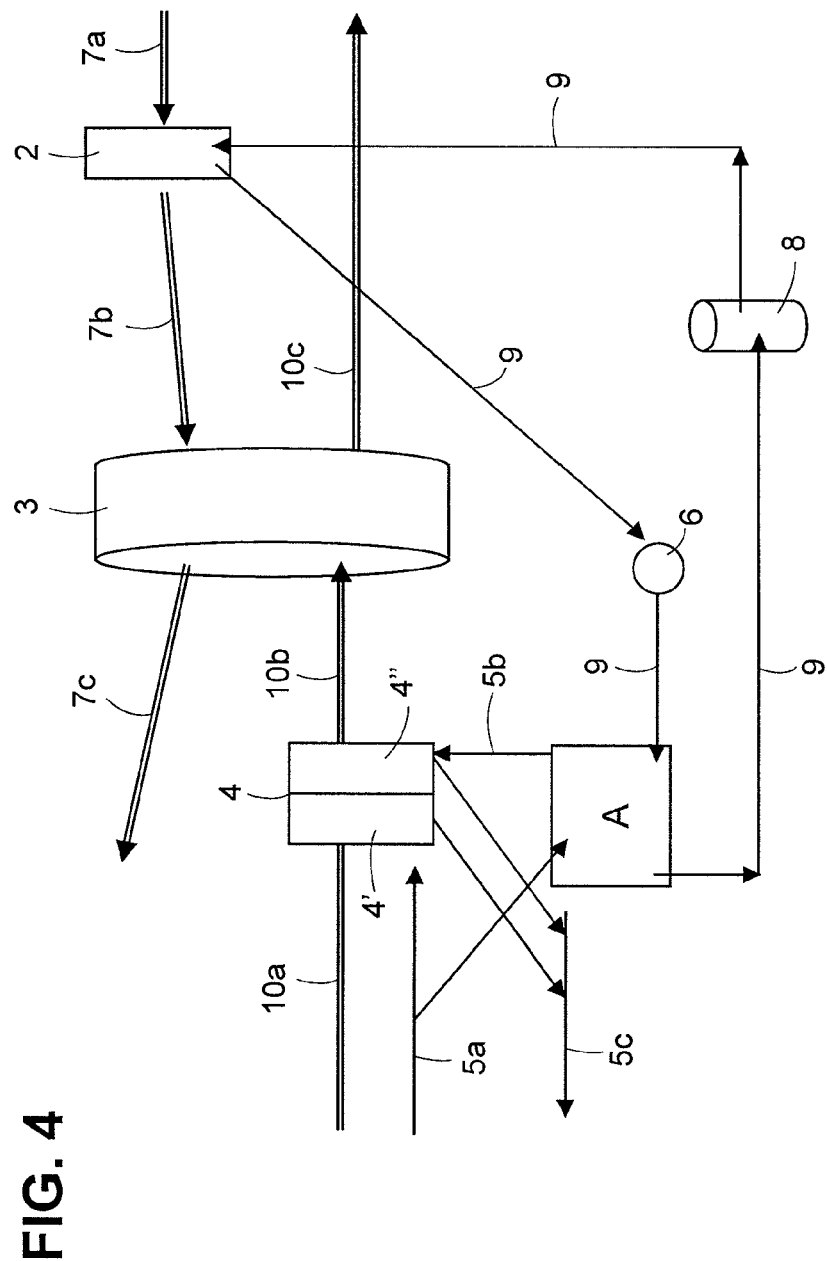
FIG. 4 is a schematic illustration of a further embodiment of the invention.

FIG. 4 represents a preferred embodiment of the invention. In this system, the evaporator A does not treat all of the aqueous coolant going to the chilled water coil 4. Instead coil 4 is configured in a so called "lead-lag" arrangement as illustrated wherein part of the water from line 5a enters lead cooling coil 4' and part is sent directly to the evaporator A for cooling before being sent to the lag cooling coil 4" and then returned to line 5c. As a result, the temperature of the water in the coil 4 in contact with the process/supply air 10a prior to its leaving of the coil can be reduced even further without increasing the size of the DX system. Control of the system also becomes simplified, as each part of the 'lead and lag' portions of the coil can be controlled independently, thus decoupling to a great extent the process control (done preferably via the lead coil) from the stability of the DX system. This approach is appropriate if lower dewpoint and delivered temperatures are desired, or if the chiller water loop is designed for a high temperature set point, as is being increasingly designed for in order to further improve the central chiller COP. Such a design set point would be utilized for the highest efficiency systems, where the water temperature is designed to provide sensible cooling only, and the hybrid dehumidification system, with its enhanced latent cooling capacity, handles the latent load, handles minimally the latent load difference between the desired space dewpoint and the design loop water temperature. This is a departure from the traditional chilled water setpoint, which is established to insure a maximum dewpoint in the space by providing sufficient cooling means to dehumidify the air.

An additional benefit to all of these approaches is that the DX refrigerant system used to generate the heat for regeneration could be used as a supplemental cooling source for the main chilled water loop at times when dehumidification was not needed, thus acting as a partial chiller backup system. This approach also allows heat to be generated to regenerate the desiccant even if cooling is not required for the dehumidification process.

Figure 5:
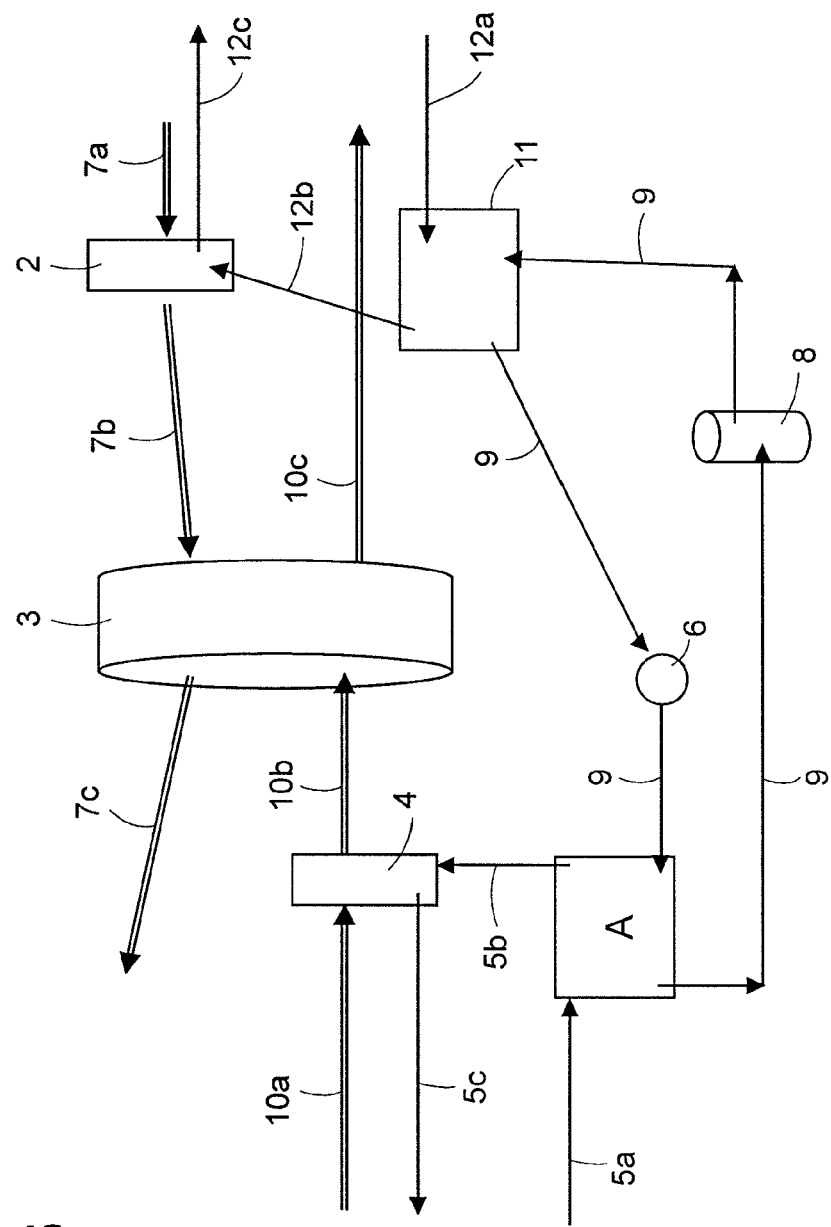
FIG. 5 is a schematic illustration of a still further embodiment of the invention.

FIG. 5 shows another embodiment of the invention using a condenser coil 11 connected to the central chiller plant feed line upstream of the cooling tower, as shown in dotted lines 12a, 12c in FIG. 1, for condensing the refrigerant of the DX system.

In situations where a low grade hot water source is available, e.g. the condensing water off of the main chiller before it goes to the tower, such heat can be used to further reduce the size of the DX system by applying that heat, from the DX system, to the hot water source to further increase its temperature to a level necessary for good desiccant regeneration. This can also be done in concert with any of the evaporator configurations shown in FIGS. 2 to 4. Thus, as seen in FIG. 5, which is a modification of the embodiment of FIG. 2, hot water from the chiller plant is supplied through line 12a to the condensing coil 11 to be heated by the DX refrigerant leaving compressor 8. The heated water is then supplied through line 12b to the air heating coil 2 to provide additional heat to the regeneration air stream 7a.

The water is then returned via line 12c to the chiller plant circulation system for cooling in the cooling tower.

Alternately the condenser 11 may be an air cooled coil located after a hot (waste heat) water coil which provides a generally consistent inlet temperature to the condensing coil, thus stabilizing the DX system and simplifying its design.

In the examples shown the desiccant means described and illustrated is a desiccant wheel, however other desiccant form factors may be used including liquid desiccants.

The embodiments discussed above are representative of preferred embodiments of the present invention and are provided for illustrative purposes only. They are not intended to limit the scope of the invention. Although specific configurations, structures, conditions, etc., have been shown and described, such are not limiting. Modifications and variations are contemplated within the scope of the present invention, which is intended to be limited only by the scope of the accompanying claims.

What is claimed is:

1. A dehumidification system for use with an aqueous/liquid chiller cooling system used to cool a heating load and including a circulating supply of chilled aqueous/liquid coolant in a recirculating line, said dehumidification system including a desiccant material for removing moisture from a supply/process air stream; a separate direct expansion refrigeration means for cooling the chilled aqueous/liquid coolant in the aqueous/liquid cooling system, said separate direct expansion refrigeration means including at least one condenser for supplying heat through the condenser to a regeneration air stream before the regeneration air stream enters the desiccant material and an evaporator heat exchanger for cooling the aqueous liquid coolant in the aqueous/liquid cooling system; and another, separate heat exchanger directly fluidly connected to said evaporator heat exchanger of the direct expansion refrigeration means, said separate heat exchanger being located in the supply/process air stream, receiving chilled aqueous/liquid from the aqueous/liquid chiller cooling system, and cooling the supply process air stream, the regeneration air stream flowing directly through the condenser to supply heat to the regeneration air stream before the regeneration air stream enters the desiccant material.

2. The dehumidification system as defined in claim 1 wherein said separate heat exchanger connected to said evaporator heat exchanger of the direct expansion refrigeration means is located in the supply/process airstream in a position before that supply/process airstream enters the desiccant material.

3. The dehumidifier system as defined in claim 1 wherein said separate heat exchanger connected to said evaporator heat exchanger of the direct expansion refrigeration means is located in the supply/process airstream in a position after the supply/process air stream leaves the desiccant material.

4. The dehumidification system as defined in claim 2 or claim 3 wherein said desiccant material comprises a rotatable desiccant wheel.

5. The dehumidification system as defined in claim 2 or claim 3 including means for supplying chilled aqueous/liquid coolant from the aqueous/liquid cooling system to the evaporator heat exchanger of the direct expansion refrigeration means wherein the chilled aqueous/liquid coolant is further cooled, then for supplying the chilled aqueous/liquid coolant from the evaporator heat exchanger to the separate heat exchanger in the supply/process air stream to cool the supply/process air stream and then to the recirculating line.

6. The dehumidification system as defined in claim 2 or claim 3 wherein said at least one condenser includes a first condenser connected to the evaporator heat exchanger of the direct expansion refrigeration system and a second condenser located in the regeneration air stream, and means for supplying aqueous/liquid coolant from the chilled aqueous/liquid cooling system to said first condenser communicating in heat exchange relation with the evaporator heat exchanger of the direct expansion refrigeration means and then to the second condenser in the regeneration air stream to first raise the temperature of the aqueous/liquid coolant in the first condenser, and for supplying the thus warmed aqueous/liquid from the first condenser to the second condenser, whereby heat from both the direct expansion refrigeration means and the warm aqueous/liquid coolant is supplied to the regeneration air stream.

7. A dehumidification system for use with an aqueous/liquid chiller cooling system used to cool a heating load and including a circulating supply of chilled aqueous/liquid coolant in a recirculating line, said dehumidification system including a desiccant material for removing moisture from a supply/process air stream; a separate direct expansion refrigeration means for cooling the chilled aqueous/liquid coolant in the aqueous/liquid cooling system, including a condenser for supplying heat through the condenser to a regeneration air stream before it enters the desiccant material for regeneration of the desiccant material and an evaporator heat exchanger for cooling the chilled aqueous/liquid coolant in the aqueous liquid cooling system; a separate heat exchanger directly fluidly connected to said evaporator heat exchanger of the direct expansion refrigeration means and located in the supply/process air stream; and means for supplying chilled aqueous/liquid coolant from the aqueous/liquid cooling system to the separate heat exchanger to cool the supply/process air stream, then supplying the aqueous/liquid coolant from the separate heat exchanger to the evaporator heat exchanger of the direct expansion refrigeration means, and then supplying the aqueous/liquid coolant from the evaporator heat exchanger to the recirculation line in the aqueous/liquid chiller cooling system whereby the direct expansion refrigeration means will generate higher temperatures in the condenser of the direct expansion refrigeration means, the regeneration air stream flowing directly through the condenser to supply heat to the regeneration air stream before the regeneration air stream enters the desiccant material.

8. The dehumidification system as defined in claim 7 wherein said separate heat exchanger connected to said evaporator heat exchanger of the direct expansion refrigeration means is located in the supply/process airstream in a position before that supply/process airstream enters the desiccant material.

9. The dehumidifier system as defined in claim 7 wherein said separate heat exchanger connected to said evaporator heat exchanger of the direct expansion refrigeration means is located in the supply/process airstream in a position after the supply/process air stream leaves the desiccant material.

10. The dehumidification system as defined in claim 8 or claim 9 wherein said desiccant material comprises a rotatable desiccant wheel.

11. The dehumidification system as defined in claim 8 or claim 9 wherein said separate heat exchanger in the supply/process air stream has first and second heat exchanger sections, and said system includes means for supplying a first portion of chilled aqueous/liquid coolant from the aqueous/liquid coolant line to the first heat exchanger section to cool the supply/process air stream and then to a return line, and for supplying a second portion of the chilled aqueous/liquid coolant from the aqueous/liquid coolant line to the evaporator heat exchanger of the direct expansion refrigeration means wherein the second portion of the chilled aqueous/liquid coolant is further chilled, then to the second heat exchanger section in the supply/process air stream to further cool the supply/process air stream and then to the recirculation line.

12. A method of dehumidifying a supply/process air stream for use with an aqueous/liquid cooling system used to cool a heating load and including a circulating supply of chilled aqueous/liquid coolant in a recirculation line, said method comprising the steps of using a desiccant material to remove moisture from a supply/process air stream, using an evaporator heat exchanger of a direct expansion refrigeration system for cooling coolant in the aqueous/liquid cooling system, supplying heat through the condenser of the direct expansion refrigeration system to a regeneration air stream before it enters the desiccant material, and fluidly connecting a separate heat exchanger directly to said evaporator heat exchanger of the direct expansion refrigeration means, said separate heat exchanger being located in the supply/process air stream, receiving aqueous/liquid coolant, and cooling the supply air stream, the regeneration air stream flowing directly through the condenser to supply heat to the regeneration air stream before the regeneration air stream enters the desiccant material.

13. The method as defined in claim 12 including the step of locating said separate heat exchanger connected to the evaporator heat exchanger of the direct expansion refrigeration means in the supply/process airstream in a position before the supply process airstream enters the desiccant material.

14. The method as defined in claim 12 including the step of locating said separate heat exchanger connected to the evaporator heat exchanger of the direct expansion refrigeration means in the supply/process airstream in a position after the supply/process airstream leaves the desiccant material.

15. The method as defined in claim 13 or claim 14 wherein said step of using a desiccant material includes the step of using a rotatable desiccant wheel.

16. The method as defined in claim 13 or claim 14 including the step of supplying chilled aqueous/liquid coolant from the aqueous/liquid cooling system to the evaporator heat exchanger of the direct expansion refrigeration means whereby the chilled aqueous/liquid coolant is further cooled, then supplying the further cooled aqueous/liquid coolant to the separate heat exchanger in the supply/process air stream to cool the supply/process air stream and then supplying the coolant from the heat exchanger to a recirculation line.

17. The method as defined in claim 13 or claim 14 including the steps of supplying aqueous/liquid coolant from said chilled aqueous/liquid cooling system to the direct expansion refrigeration condenser to raise the temperature of that aqueous/liquid coolant and then supplying the thus warmed aqueous/liquid from the condenser to a second separate heat exchanger, and locating the separate second heat exchanger in the regeneration air stream whereby heat from both the direct expansion refrigeration means and the warm aqueous/liquid coolant is supplied to the regeneration air stream.

18. A method of dehumidifying a supply/process air stream for use with an aqueous/liquid chiller cooling system used to cool a heating load and including a circulating supply of chilled aqueous/liquid coolant in a recirculating line, said method comprising the steps of using a desiccant material to remove moisture from a supply/process air stream, using a direct expansion refrigeration system including an evaporator heat exchanger and a condenser, locating the condenser directly in a regeneration air stream supplied to the desiccant material for heating the regeneration air stream before it enters the desiccant material, supplying chilled aqueous/liquid coolant from the aqueous/liquid cooling system to a separate heat exchanger located in the supply/process air stream to cool the supply process air stream, then supplying the aqueous/liquid coolant from the separate heat exchanger directly to the evaporator heat exchanger of the direct expansion refrigeration system, and then supplying the aqueous/liquid coolant from the evaporator heat exchanger to the recirculation line whereby the direct expansion refrigeration system will generate higher temperatures in the condenser.

19. The method as defined in claim 18 including the step of locating said separate heat exchanger connected to the evaporator heat exchanger of the direct expansion refrigeration means in the supply/process airstream in a position before the supply process airstream enters the desiccant material.

20. The method as defined in claim 18 including the step of locating said separate heat exchanger connected to the evaporator heat exchanger of the direct expansion refrigeration means in the supply/process airstream in a position after the supply/process airstream leaves the desiccant material.

21. The method as defined in claim 19 or claim 20 wherein said step of using a desiccant material includes the step of using a rotatable desiccant wheel.

22. The method as defined in claim 19 or claim 20 including the steps of providing the separate heat exchanger in the supply/process air stream with first and second heat exchanger sections, supplying a first portion of chilled aqueous/liquid coolant from the aqueous/liquid coolant recirculation line to the first heat exchanger section to cool the supply/process air stream and then supplying that first portion of the chilled aqueous/liquid coolant to the recirculation line, and supplying a second portion of the chilled aqueous/liquid coolant from the aqueous/liquid coolant recirculation line to the evaporator heat exchanger of the direct expansion refrigeration means wherein the second portion of the chilled aqueous/liquid coolant is further chilled, then supplying that further chilled second portion to the second heat exchanger section in the supply/process air stream to further cool the supply/process air stream and then supplying that second portion to the recirculation line.

* * * * *